(12) United States Patent
Lajoie (10) Patent No.: US 12,493,231 B2
(45) Date of Patent: Dec. 9, 2025

(54) MODULAR VIDEO ATTACHMENT WITH VIBRATION DAMPENING ENHANCED BY VIBRATION COMPENSATING RINGS

(71) Applicant: Timothy P. Lajoie, Templeton, MA (US)

(72) Inventor: Timothy P. Lajoie, Templeton, MA (US)

( * ) Notice: Subject to any disclaimer, the term of this patent is extended or adjusted under 35 U.S.C. 154(b) by 157 days.

(21) Appl. No.: 18/407,158

(22) Filed: Jan. 8, 2024

(65) Prior Publication Data

US 2024/0231198 A1     Jul. 11, 2024

Related U.S. Application Data

(60) Provisional application No. 63/437,442, filed on Jan. 6, 2023.

(51) Int. Cl.
*G03B 17/56*     (2021.01)
*F16F 15/03*     (2006.01)

(52) U.S. Cl.
CPC .......... *G03B 17/561* (2013.01); *F16F 15/03* (2013.01); *F16F 2224/02* (2013.01); *F16F 2230/0005* (2013.01); *F16F 2230/14* (2013.01)

(58) Field of Classification Search
CPC .......... B60R 11/0005; B60R 11/0241; H04M 1/6075; F16M 11/041; F16F 15/03
See application file for complete search history.

(56) References Cited

U.S. PATENT DOCUMENTS 10,437,136 B2 * 10/2019 Lajoie .................. F16F 1/36

* cited by examiner

*Primary Examiner* — Noam Reisner
(74) *Attorney, Agent, or Firm* — William W. Cochran; Cochran Freund & Young LLC (57) ABSTRACT

Disclosed is a system for mounting video equipment to an object and to provide enhanced vibration dampening through vibration concentrating ridges/rings that focus vibrations into an attached vibration dampener. An embodiment may incorporate a magnetic post for magnetically attaching video equipment. Another embodiment may incorporate a T-shaped base for attaching an action camera.

13 Claims, 11 Drawing Sheets

MODULAR VIDEO ATTACHMENT WITH VIBRATION DAMPENING ENHANCED BY VIBRATION COMPENSATING RINGS

CROSS REFERENCE TO RELATED APPLICATIONS

This application is based upon and claims the benefit of U.S. provisional application Ser. No. 63/437,442, filed Jan. 6, 2023, entitled "UV-90 Magnetic Gimbal Cell Phone Mount," all of which is also specifically incorporated herein by reference for all that it discloses and teaches.

BACKGROUND OF THE INVENTION

Action cameras and video devices, including cell phones and small portable video cameras such as Go-Pro® cameras, may be mounted on objects such as archery equipment, firearms, crossbows, cars, recreational vehicles, ATV's, boats, planes and other objects. A mounted camera or video device may vibrate during use of the object on which it is mounted. Some mountings on objects may experience more severe vibrations during use of the object such that the action camera or video device also experiences more sever vibrations.

SUMMARY OF THE INVENTION

An embodiment of the present invention may comprise a system for securing video equipment to an object, the system comprising: a gimbal assembly to accommodate at least one type of video equipment having an arm for attaching to the object; a dampener base disposed on one side of the arm of the gimbal, wherein the dampener base has vibration concentrating ridges/rings that focus vibrations of the arm into an attached vibration dampener; the vibration dampener positioned at a center of the vibration concentrating ridges/rings of the dampener base on the arm of the gimbal assembly such that the vibrations of the arm of the gimbal assembly are focused into the vibration dampener; a base facing end of the arm of the gimbal assembly; a quick release clip attached to the base facing end of the arm of the gimbal assembly; and wherein the gimbal assembly is attachable to the object a base plate, wherein the object is a vibration causing object, and wherein the base plate is connected to the quick release clip attached to the arm of the gimbal assembly.

DETAILED DESCRIPTION OF THE EMBODIMENTS

The present U.S. Non-Provisional Patent application is an improvement of U.S. Pat. No. 10,437,136, entitled, "Modular Video Attachment with Vibration Dampening," filed on Jul. 22, 2016, which is specifically incorporated herein by reference for all that it discloses and teaches.

After using the original action camera/cell phone mount with vibration dampening for securing video equipment (such as cell phones and action cameras), it was found that some applications experiencing severe vibrations did not have the vibrations dampened to the degree desired. In order to further dampen vibrations, vibration concentrating ridges/rings were added at the positioning location of the "LimbSaver" vibration dampeners to focus the action camera/cell phone mount's vibrations into the vibration dampeners. The vibrations generated in the arm section of action camera/cell phone mount are further dampened by adding equal and balanced dampening at the center of mass of the arm of the action camera/cell phone mount. A dampener may also be added to the back of the camera mount gimbal.

Further, the ball and socket system may also be enhanced with overmolding. The overmolding was found to deliver a smooth and strong hold. The overmolding is a process of introducing a softer plastic or rubber material into and over a previously molded harder plastic, such as the ball of the ball and socket system, forming a coating onto the molded part being overmolded. The overmolding applied to the ball of the ball and socket system further provides dampening and gripping capability to deliver the smooth and strong hold.

It was also found that some of the cell phone type mounts used with the action camera/cell phone mount were less than tough enough to endure the severe vibration delivered during the shot on both archery equipment and firearms. To help further mitigate these severe vibrations, it was found that a 19 lb. Neodymium magnet with supporting padded base arms helped to properly hold the cell phone and the magnetic mount had no failures either in structural features or holding power. It was found that the magnetic gimbal along with the powerline featured ball and socket system with overmolding delivers an exceptionally smooth and extremely strong hold. Additionally, for the cell phone type mount, a smaller dampener was added to the back of the magnet to provide an equal and balanced dampening. Vibration concentrating rings may also be added to the dampener positioning location on the back of the magnet to further concentrate the vibrations into the vibration dampener.

Under extreme conditions, a blow to a cell phone or other similarly mounted video device may overpower the 19 lbs. of pulling power of the Neodymium magnet. In order to combat this problem, a safety rubber band attachment may be added to the cell phone type mount. In the rear of the gimbal base there is a raised ridge that will hold a supplied rubber band. The rubber band looped through from the front of the gimbal and is looped up over the ridge. The top of the band is pulled under the phone and pulled tightly up and hooked to a clip provided on the top and behind the magnet. This rubber band safety attachment gives the user a fantastic hold in extreme situations.

Two of the various embodiments of the invention may include:
  a universal, vibration dampening 90° action camera type mount; and
  a universal, vibration dampening 90° magnetic command post type mount for cell phones and other similarly shaped devices.

One of the various embodiments may have re-designed, six-holed base that includes two sets of 3/16" counter sunk screw holes on each side, with a pair of #10 counter sunk holes. Newer archery equipment is using the larger screws. To accommodate most equipment, both the larger and smaller screw size holes for the base may be made available.

The various embodiments may have added length to the quick release clips as well as strength by thickening the clips arms. The added length to the clips allows easier insertion and easier removal when wearing gloves or mittens or for users having large fingers.

For various embodiments, the six-holed base may also have added 3M VHB tape. The 3M VHB tape is very high bond tape that sticks almost everywhere. A user needs to thoroughly clean the surface the tape is to be applied to with rubbing alcohol prior to application and then press the base with the tape onto the desired surface and let cure for one hour before using.

Various embodiments may use threaded inserts in the attachment of gimbal halves together. The inserts may be part of the molding. The inserts may further be all M5×0.8 pitch brass threaded inserts which are insert molded into the parts.

For various embodiments, the screws may be assembled by the factory. Various embodiments may use Stainless PLASTITE Screws: M2.5×12 mm Long, Phillips Drive, for a quantity of 3 to assemble a latch to the arm.

One of the various embodiments may utilize a hardware list as follows:
  Stainless SHCS: M5×0.8 pitch×20 mm Long, Qty: 1 (for each version);
  Thumb Screw (Plastic and Stainless): M5×0.8 pitch×35.5 mm long thumb screw with an 18.5 mm thread length, Qty: 1 (for each version);
  Stainless BHCS: M4×0.7 pitch×8 mm Long (to hold magnet in place), Qty: 1;
  Stainless FHCS: #10-24×0.75" Long, Qty: 2 (to attach base to archery bow or other object) per set;
  Stainless FHCS: #8-32×0.75" Long, Qty: 4 (for the four other holes to attach to whatever object) per set;
  Stainless 1/4-20 Camera Screw, Qty: 1 (used to attach the camera to the universal gimbal) for only the universal version.

Figure 1:
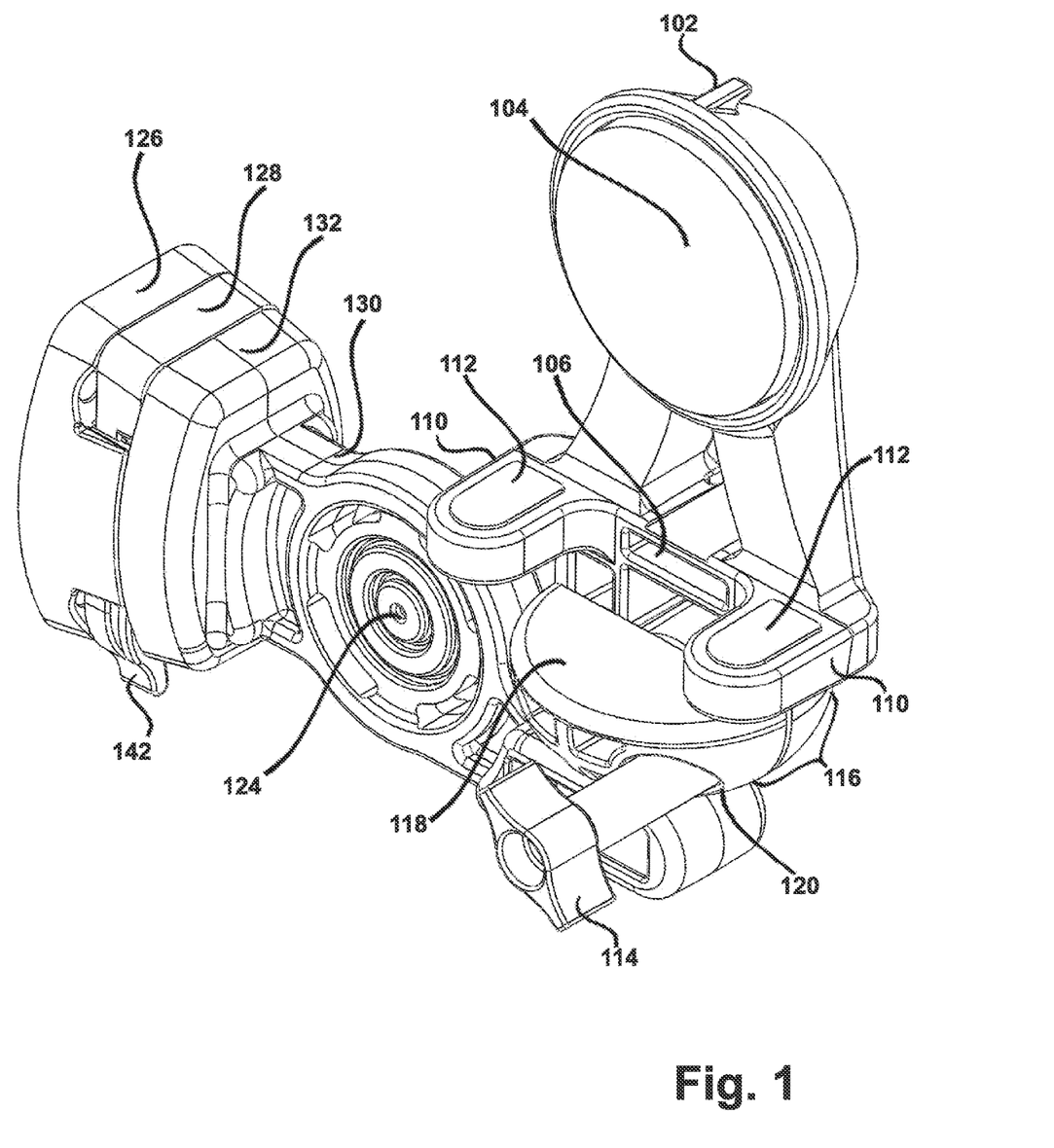
FIG. 1 is an assembled front facing isometric view of an embodiment with a magnetic command post type mount for cell phones and other similarly shaped devices.

FIG. 1 is an assembled front facing isometric view of an embodiment with a magnetic command post type mount for cell phones and other similarly shaped devices. The base/base plate 126 is attached to the gimbal 116 with a quick release clip 128 attached to the base facing arm end 132 that extends to the arm 130 and the gimbal assembly 116. The magnetic post 104 is disposed vertically from the gimbal assembly 116 and further incorporates two cell phone (or other similarly shaped device) holding legs/shelves 110.

Figure 6A:
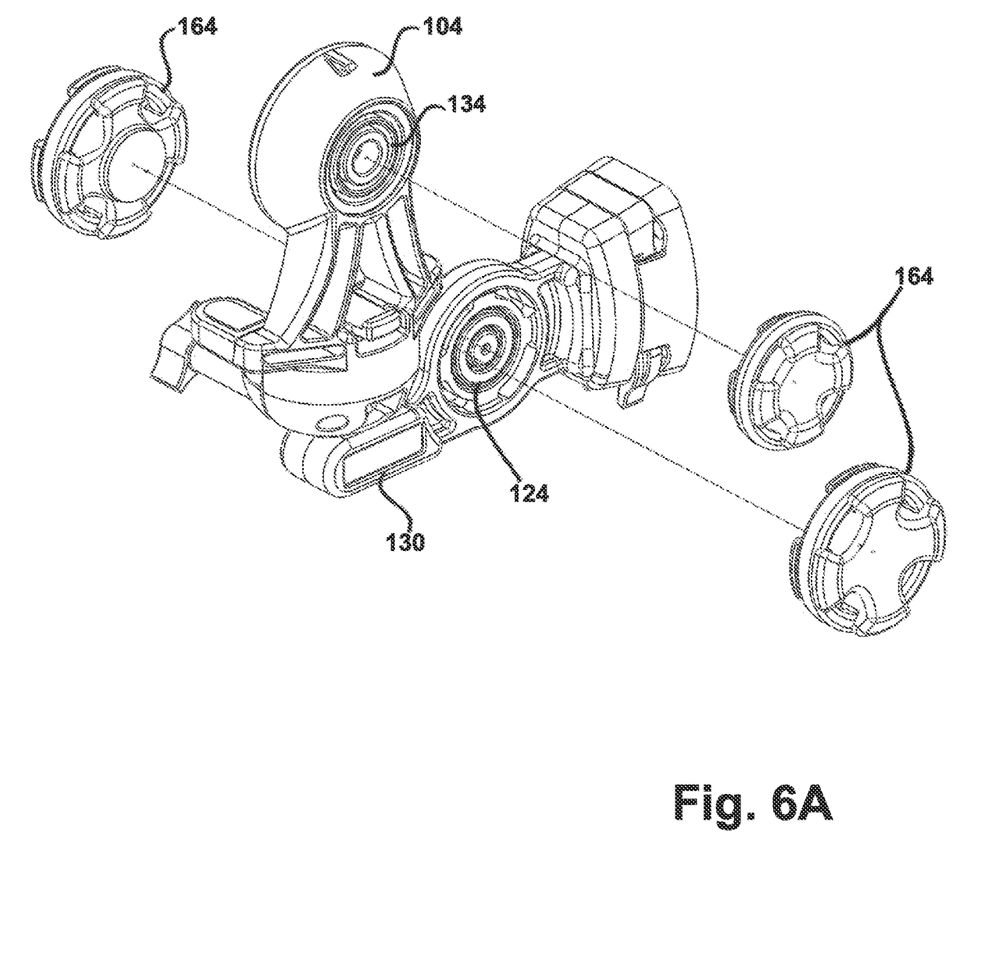
FIG. 6A is a partially exploded back facing isometric view of an embodiment with a magnetic command post type mount for cell phones and other similarly shaped devices showing the addition of vibration dampeners (aka. "LimbSaver" vibration dampeners).
Figure 6B:
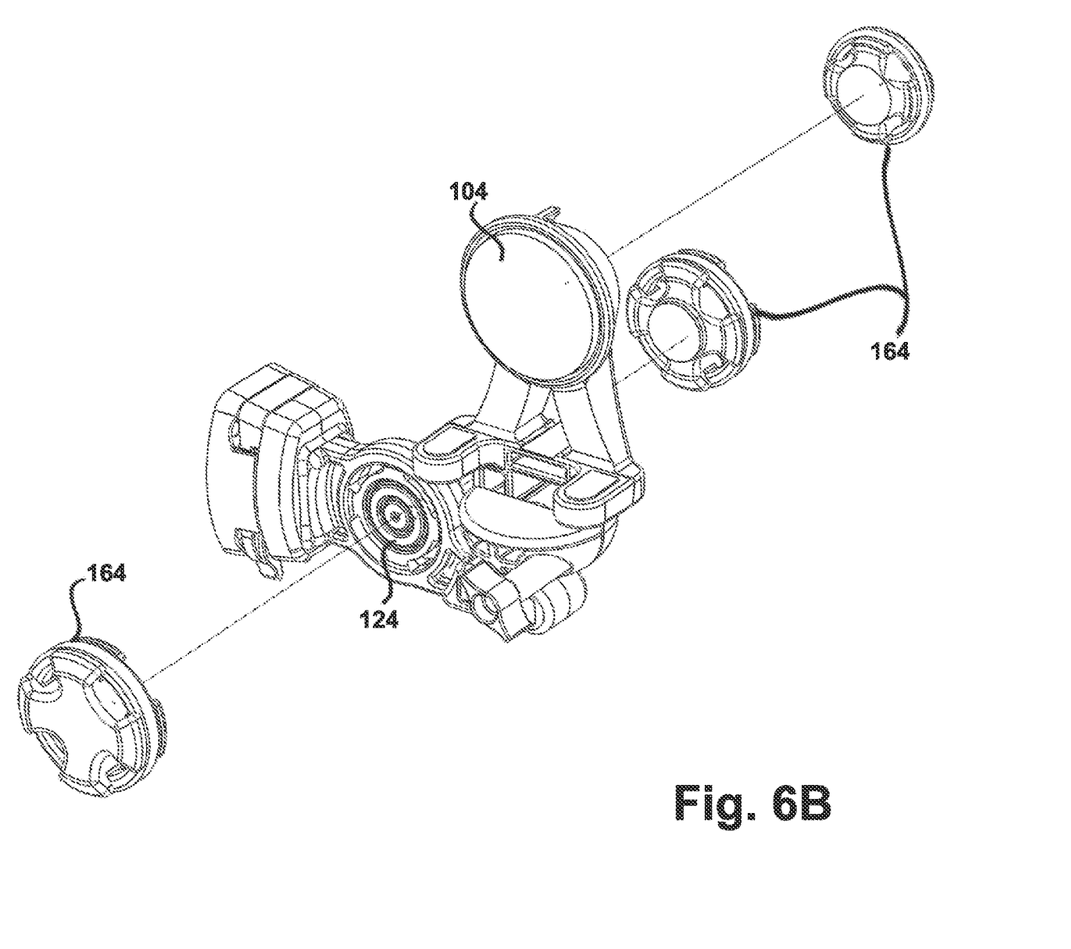
FIG. 6B is a partially exploded front facing isometric view of an embodiment with a magnetic command post type mount for cell phones and other similarly shaped devices showing the addition of vibration dampeners (aka. "LimbSaver" vibration dampeners).

A rubber band grasping hook 102 is used to secure a rubber band giving holding power in addition to the magnet cell phone connection post 104. The other end of the rubber band is attached to the ridge 108 located on the base plate of the gimbal (see FIG. 6). The rubber band is to be inserted through the rubber band slot 106 provided under the phone holding legs 110, looped up and over the ridge 108, pulled tightly toward the front of the gimbal 118 once the cell phone or similarly sized device is in position, and securely held by the magnet 104. The rubber band is to be pulled up in front of the cell phone/similarly sized device and attached to the rubber band clip 102 above and behind the magnet 104 for increased holding power of the magnet 110/phone connection. The magnet 104 is a 19 lb. pull holding power Neodymium rare earth rubber coated magnet with a rear facing threaded grasping means. Soft foam rubber pads 112 that apply with two-sided tape may be attached to the cell phone holding legs/shelves 110 in order to allow the cell phone/other similarly sized device a soft base that helps with positioning, reduces vibration, and adds holding power. The rubber pads 112 help keep the cell phone/other similarly sized device secure and held flat on the supporting arms 110.

The thumbscrew allows an embodiment user the ability to loosen and tighten the ball and socket gimbal 116 giving a tripod-like mobility from the ball and socket 116. Smooth movement side to side and up and down allows the user to tighten the gimbal 116 in the perfect line of sight desired and to securely stay in position even under extreme shock and vibration. The gimbal front 118 is at the front of ball and socket 116 that is the front half 118 of the gimbal 116. The gimbal front 118 has one side hole 120 that is not threaded and has a radius to accommodate the flat end of the thumbscrew (or set screw) 114. The other side hole 122 is threaded using a threaded insert 138 (neither shown in FIG. 1). The base of the gimbal assembly 116 may have the holes 120, 122 similarly placed, but having the thumb/set screw 114 on the opposite side to allow for the user to use the thumb/set screw 114 on either side so the gimbal 116 direction can be forward facing or rear facing, and the thumb/set screw 114 will remain on the outside edge of the mount. The gimbal front 118 is designed to be as strong as possible. The ball accepting radius 144 has maximum surface area contacting our powerline designed ball 146 (neither shown in FIG. 1). This ball 146 has lines like Saturn rings that are slightly raised and come to a sharp point that creates focused pressure to the gimbal 116. With a softer rubber or plastic material (overmolding) coating to the entire ball 146 adds to the smooth movement of the gimbal 116 along with added grip strength to the ball and socket's hold.

The six-holed quick release clip base 126 is used to attach the gimbal 116 to an object (such as an archery bow, other archery equipment, firearms, crossbows, cars, recreational vehicles, ATV's, boats, planes or other desired objects). An embodiment of the base plate 126 may have 3M VHB two-sided tape applied to the bottom 170 (see FIG. 8). Other embodiments may be attached to an object with magnetic, picatinny rail, suction cup, hasps clasps, or other type connectors as may be understood by one skilled in the art. An original base 126 embodiment was designed to have three equally sized holes on both the top and the bottom of the base 126. In the original base 126 embodiment, these holes were ³⁄₁₆" in diameter. The newest archery bows have started to offer a #10 sized screw to attach to the sight area of the bows. In order to fit these newer models, an embodiment may place the #10 diameter holes in the center offering of the six-holed base 126, allowing users the option of using either screw size application as well as a 3M tape 170 option which will apply to almost all flat surfaces.

The quick releasee clip 128 may be a newly designed clip 128 that has finger shaped bottom arms 142 that extend slightly below the six-holed base 126 when attached. With the finger shape 142 of the quick release clip 128 and the fact that the bottom arms 142 extend below the base 126 allows a user a finger friendly feel to disengage the clip 128 from the base 126 and leverage to release the clip 128. This allows users with gloves, mittens, and large fingers to easily release the mount 116. Embodiments may also reinforce the design by adding material to the arms 142 of the quick release clip 128 and slightly fine tune the clip edges to ensure a tight fitting, tough quick release clip 128.

The 90-degree arm 130 of various embodiments share the six-holed base 126, quick release clip 128, arm 130, and gimbal front 118. The arm 130 begins with three threaded inserts applied to the base facing end 130 that attaches the quick release clip 128 to the arm 130. The arm 130 then has vibration dampener bases 124 on both sides of the arm. When the vibration dampeners (aka. "LimbSaver" vibration dampeners) 164 are attached (see FIGS. 7A & B), it becomes a very symmetrical shape with equal dampeners 164 on each side and a similarly shaped ring 124 that is the arm itself. This symmetry assists in vibration dampening that is seen, felt, and heard in the action camera, cell phone or other device. An embodiment thus reduces vibration by producing as little as possible in the first place. Minimizing material and the size of the mount itself, in addition to addressing stress points, all add to the mount's effectiveness. Strategic placement of dampeners 164 when the vibration is focused through the vibration focusing rings 124 into the vibration dampeners 164 it greatly reduces vibration that is transferred into the camera, cell phone, or other device. The dampener base 124 has vibration focusing ridges/rings 124 that focus the vibrations into the vibration dampeners 164. The vibration dampeners 164 may be attached by using two-sided tape in the center of the raised ridges 124 that deliver the vibration from the arm 130 of the mount directly into the center of the dampener 164.

Figure 2A:
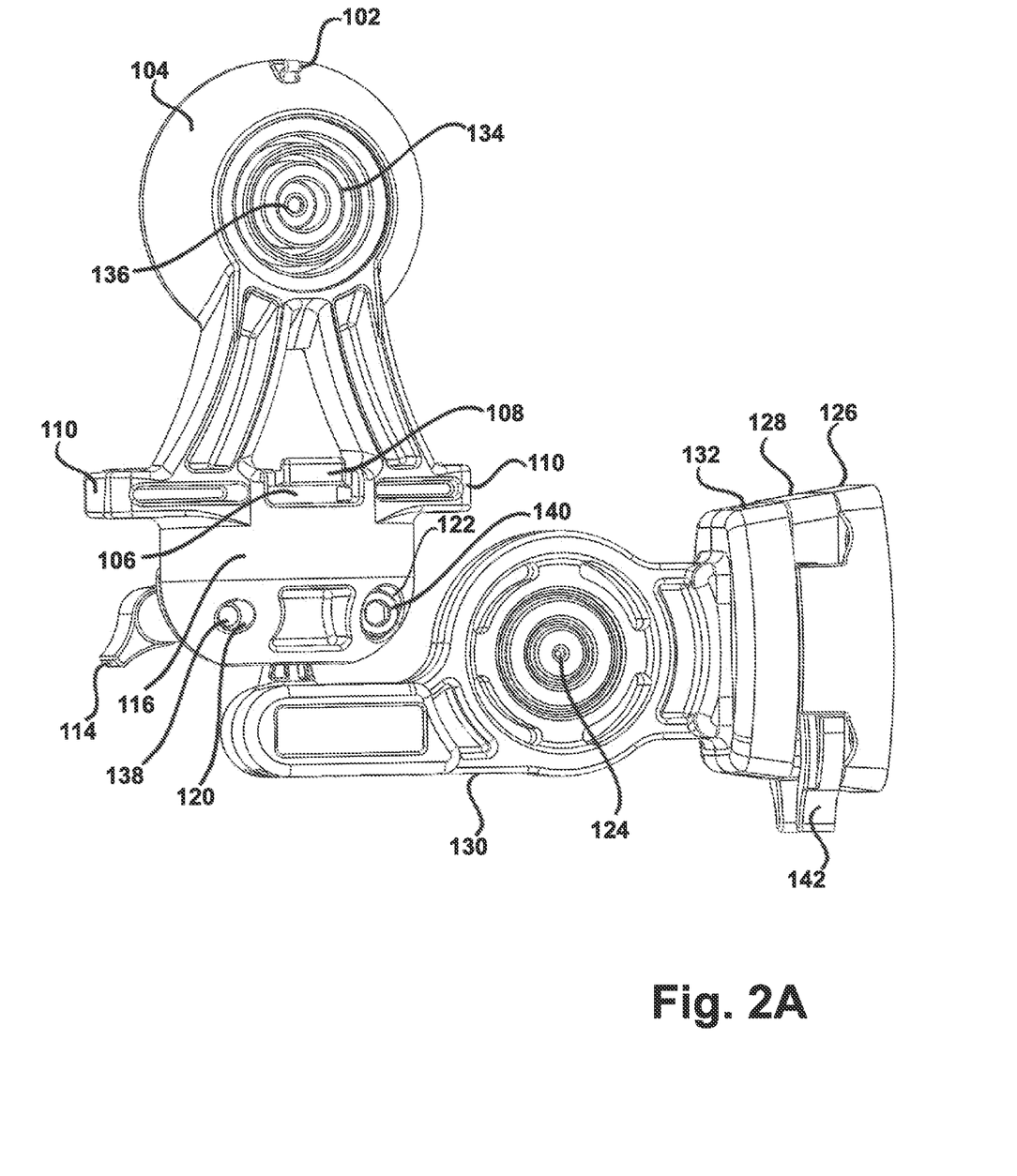
FIG. 2A is an assembled back facing isometric view of an embodiment with a magnetic command post type mount for cell phones and other similarly shaped devices.

FIGS. 2A & B and 3 show a similar embodiment as shown in FIG. 1 and share a similar description of the embodiment as described above with respect to FIG. 1.

FIG. 2A is an assembled back facing isometric view of an embodiment with a magnetic command post type mount for cell phones and other similarly shaped devices. The base 126, quick release clip 128, arm 130, back side dampener base 124 has vibration focusing ridges/rings 124, gimbal assembly 116, and magnetic command post 104 appear similar to FIG. 1, except as viewed from the back. A brass heated threaded insert 138 may be incorporated into the backside of hole 120 and an Allen head set screw 140 may be inserted into hole 122. The rubber band ridge 108 is above the rubber band pass through hole/slot 106 between cell phone holding arms/shelves 110. The extended fingers 142 of the quick release clip 128 provide a user with gloves, mittens or large fingers easier operation of the quick release clip 128. The magnet 104 is attached using magnet grasping screw 136. An additional back of magnet 104 dampener base 134 has vibration focusing ridges/rings 134 similar to the arm dampener base 124 that focus the vibrations into a vibration dampener 164 (see FIG. 6). The vibration dampener 164 behind the magnet 104 may be attached by using two-sided tape in the center of the raised ridges 134 that deliver the vibration from the magnet post 104 of the mount directly into the center of the dampener 164.

Figure 2B:
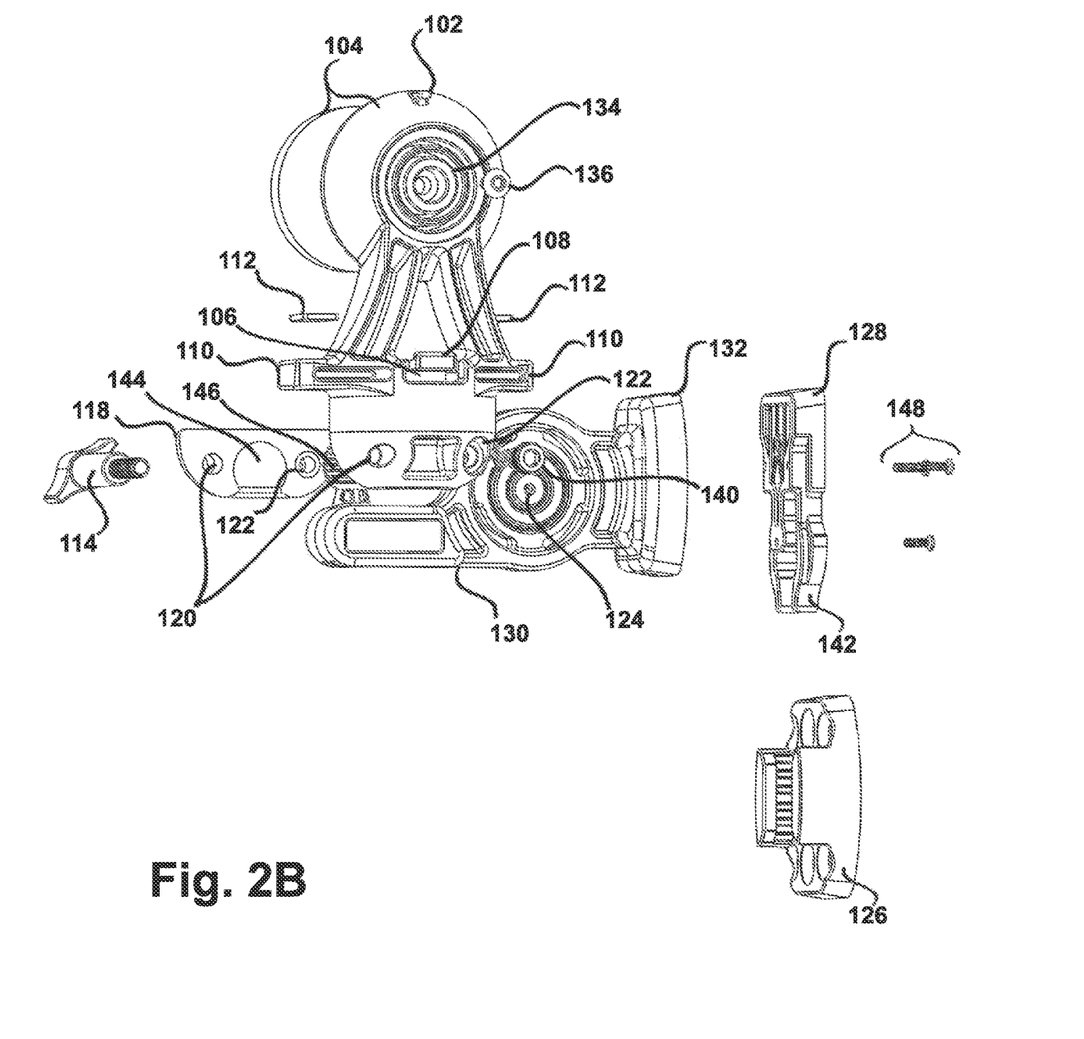
FIG. 2B is a partially exploded back facing isometric view of an embodiment with a magnetic command post type mount for cell phones and other similarly shaped devices.

FIG. 2B is a partially exploded back facing isometric view of an embodiment with a magnetic command post type mount for cell phones and other similarly shaped devices. The gimbal front 118 grasping means ball recess 144 holds the powerline ball 108 of the gimbal ball and socket 116. The gimbal 116 design of the embodiment allows the maximum surface area for evenly applied pressure on the ball 146 with our powerlines and an overmolding process. The ball 146 has powerlines and overmold applied. The three Phillips head screws 146 attach the quick release clip 128 to the arm 130 at the base plate facing arm end 132. In addition to screw attachments the six holed base 126 may be attached to an object with 3M VHB tape 170 (see FIG. 8), magnetic, picatinny rail, suction cup, hasps clasps, or other means as understood by one of skill in the art.

Figure 3:
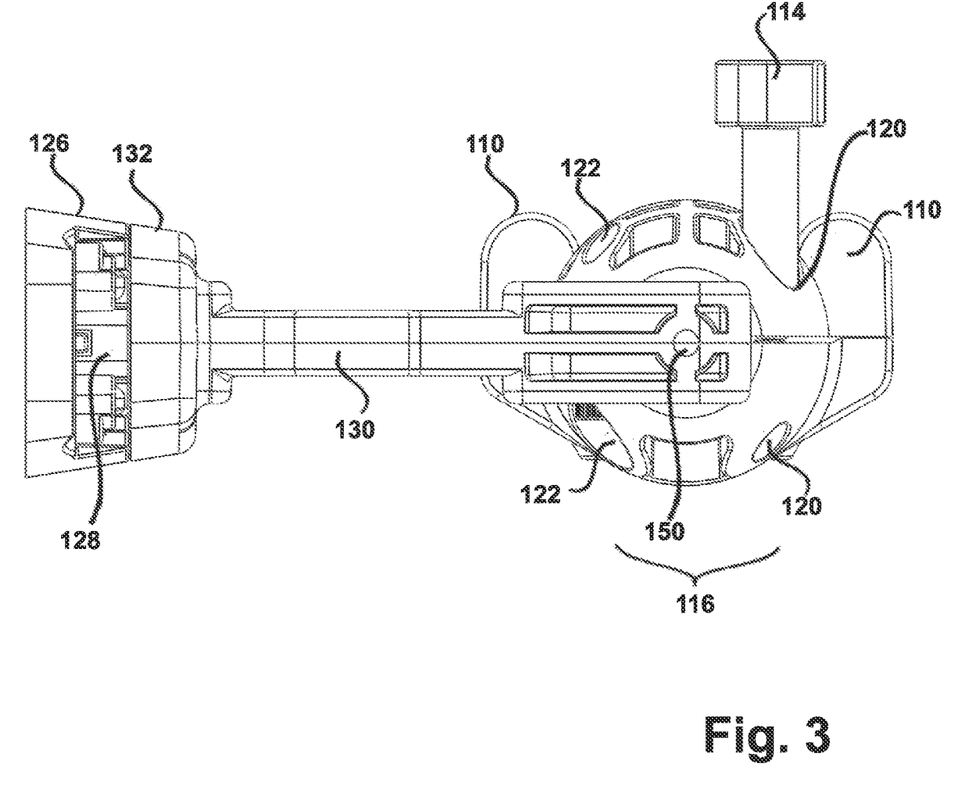
FIG. 3 is a bottom facing view of an embodiment with a magnetic command post type mount for cell phones and other similarly shaped devices.

FIG. 3 is a bottom facing view of an embodiment with a magnetic command post type mount for cell phones and other similarly shaped devices. The overmolding injection port 150 for providing the overmolding to the ball 146 is shown on the bottom of the arm 130 of gimbal assembly 116.

Figure 4:
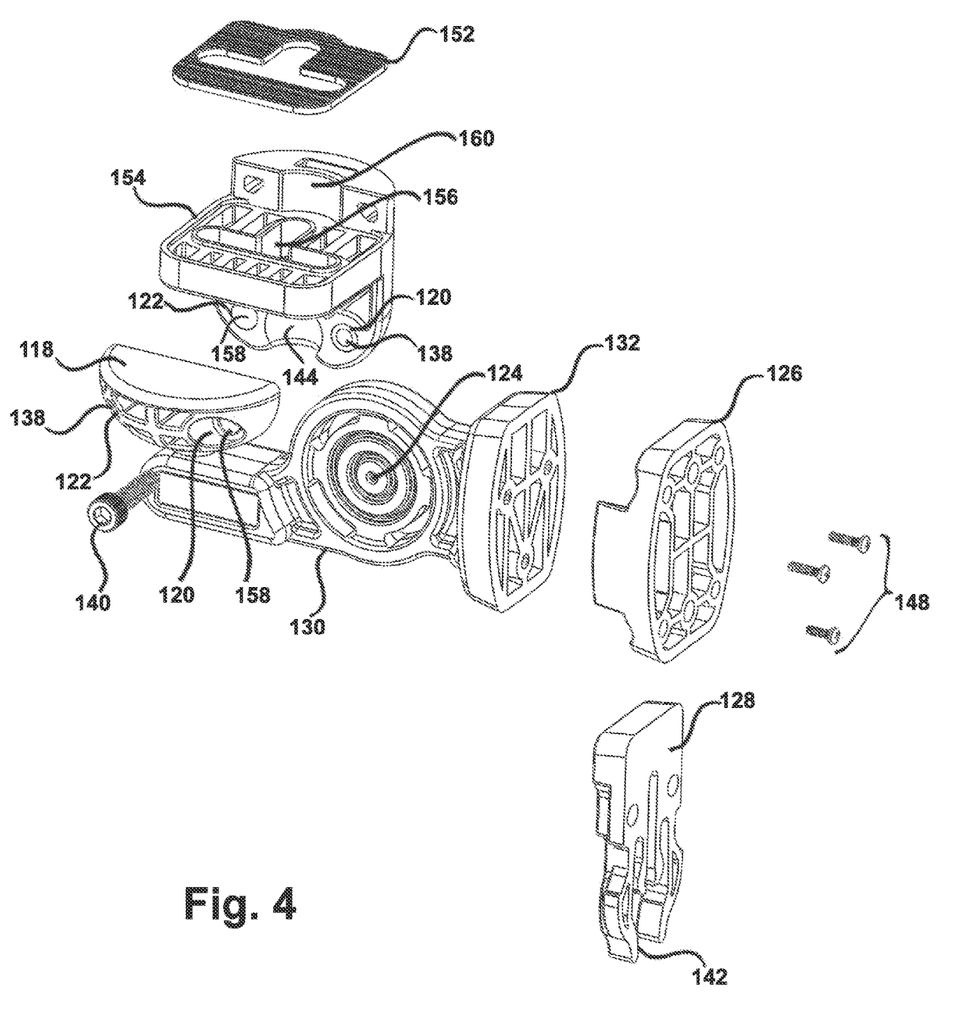
FIG. 4 is a partially exploded front facing isometric view of an embodiment with an action camera type mount.
Figure 5:
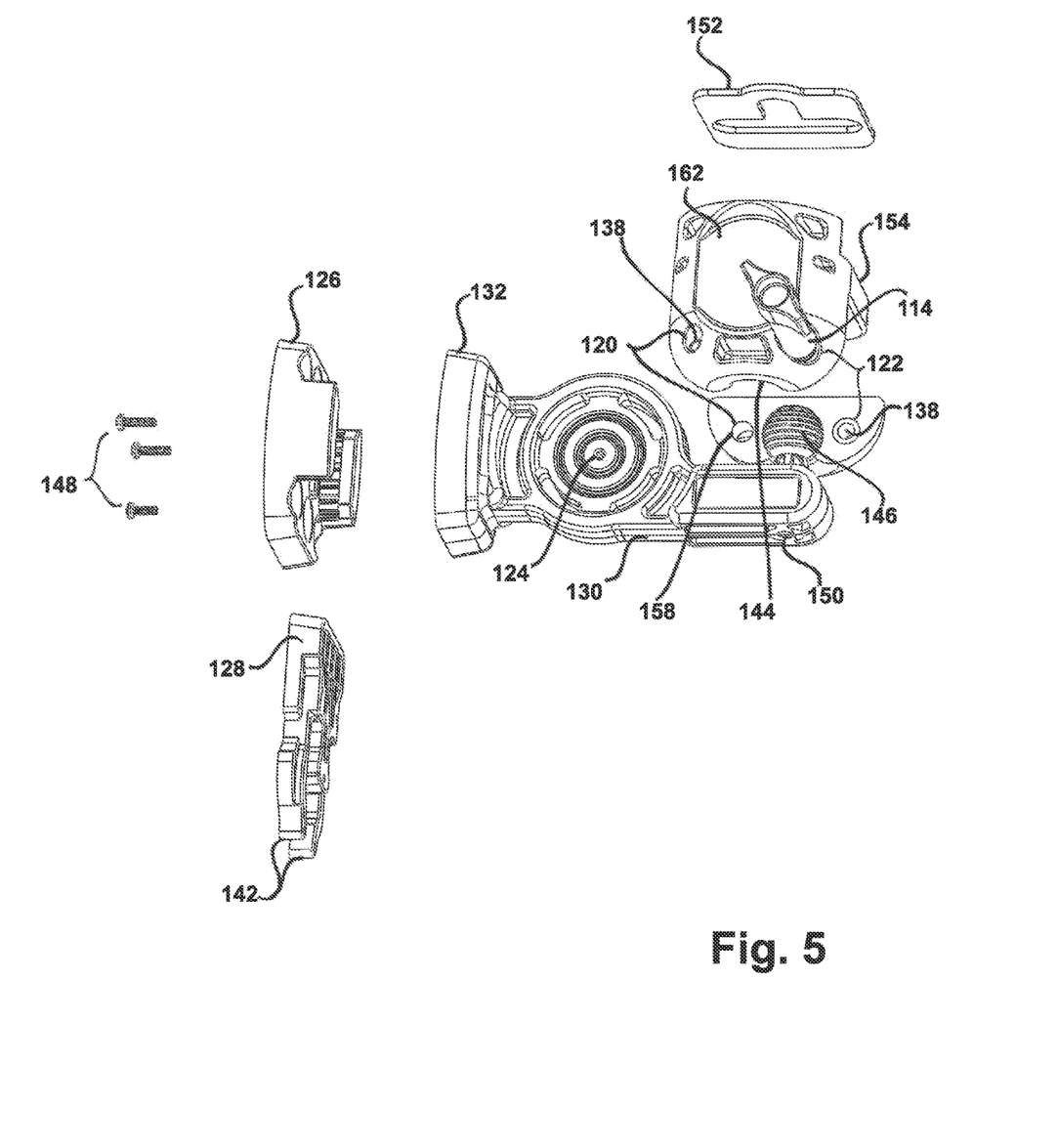
FIG. 5 is a partially exploded front facing isometric view of an embodiment with an action camera type mount.

FIGS. 4 and 5 show an embodiment with an action camera type mount, but the disclosure with respect to the base 126, quick release clip 128, arm 130, front and back side dampener base 124 having vibration focusing ridges/rings 124, and gimbal assembly 116 are similar to the disclosure with respect to FIGS. 1-3 above. The embodiments in FIGS. 4 and 5 show the gimbal assembly 116 in a reverse configuration as that shown in FIGS. 1-3. The quick release clip 128 has similar glove friendly extended fingers 142 and is similarly attached with the 3 Phillips head screws 148.

FIG. 4 is a partially exploded front facing isometric view of an embodiment with an action camera type mount. The rubber padded 152 camera base 154 of an embodiment holds most action cameras and cell phone mounts that have a ¼ 20 threaded base. The rubber pad 152 is die cut to fit the T-shaped slotted base 154. The top of the T-shaped slotted base 154 may be made with a raised edge that frames the top surface area to allow ease of applying the rubber pad 152. The die cut pad 152 may have a sticky tape bottom for application purposes. The rounded radius 160 in the back the T-shaped slotted base 154 of the gimbal assembly 116 is designed for accepting round shaped/round bottomed action camera bases. The T-shaped action camera/cellphone attaching mounting slot 156 for ¼ 20 threaded base attachment is shown in the center of the T-shaped slotted base 154. A non-threaded 158 thumbscrew or set screw hole 120 accepts Allen headed set screw 140 in the gimbal front 118. A threaded insert is in the back of gimbal 116 hole 120 for the set screw 140. A threaded insert 138 also is used in hole 122 of the gimbal front 118 to accept a screw through the gimbal assembly 116 back hole 122 that is non-threaded 158 for acceptance of a thumb or set screw 140.

FIG. 5 is a partially exploded front facing isometric view of an embodiment with an action camera type mount. On the back of the gimbal assembly 116 is a base for applying a vibration dampener 164. Thumbscrew 140 passes through hole 122 on the backside of the gimbal assembly to attach to hole 122 with threaded insert 138 of the gimbal front 118 as part of the gimbal assembly 116. Unthreaded 158 hole 122 of the gimbal front 118 allows a screw to pass through the gimbal front to 118 hole 122 with threaded insert 138 of the back of the gimbal assembly 116. The ball with powerlines 146 of the gimbal assembly fits into ball accepting radius 144. The arm dampener base 124 has vibration focusing ridges/rings 124 that focus the vibrations into the vibration dampeners 164 (see FIG. 6). The vibration dampeners 164 may be attached by using two-sided tape in the center of the raised ridges 124 that deliver the vibration from the arm 130 of the mount directly into the center of the dampener 164.

FIGS. 6A & B show a similar embodiment as shown in FIGS. 1-3 and share a similar description of the embodiment as described above with respect to FIGS. 1-3. Only callouts pertinent to the application of vibration dampeners (aka. "LimbSaver" vibration dampeners) 164 are shown in FIGS. 6A & B to avoid confusion. FIG. 6A is a partially exploded back facing isometric view of an embodiment with a magnetic command post type mount for cell phones and other similarly shaped devices showing the addition of vibration dampeners 164. FIG. 6B is a partially exploded front facing isometric view of an embodiment with a magnetic command post type mount for cell phones and other similarly shaped devices showing the addition of vibration dampeners 164. The arm dampener bases 124 have vibration focusing ridges/rings 124 that focus the vibrations into the vibration dampeners 164. The vibration dampeners 164 may be attached by using two-sided tape in the center of the raised ridges 124 that deliver the vibration from the arm 130 of the mount directly into the center of the dampener 164. The back of magnet 104 dampener base 134 has vibration focusing ridges/rings 134 similar to the arm dampener base 124 that focus the vibrations into a vibration dampener 164. The vibration dampener 164 behind the magnet 104 may also be attached by using two-sided tape in the center of the raised ridges 134 that deliver the vibration from the magnet post 104 of the mount directly into the center of the dampener 164.

Figure 7A:
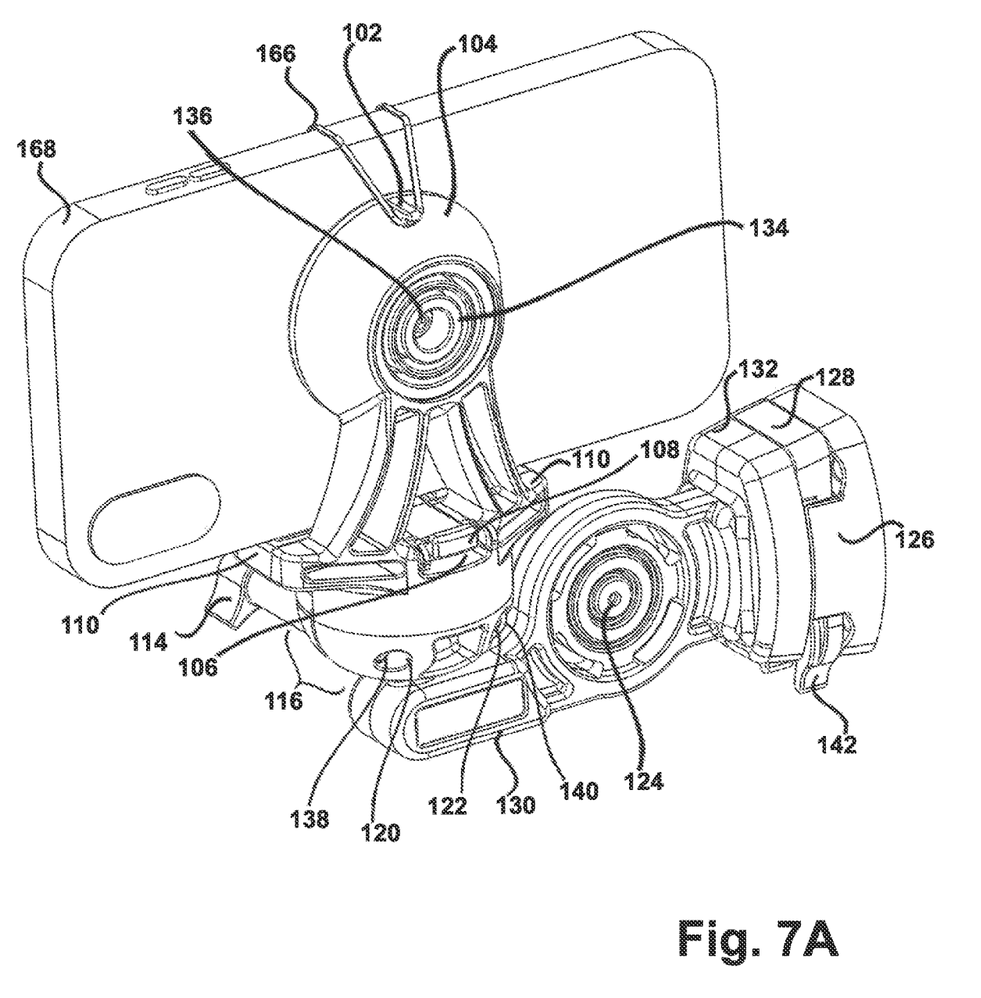
FIG. 7A is a partially exploded back facing isometric view of an embodiment with a magnetic command post type mount for cell phones and other similarly shaped devices showing the addition of a cell phone, or similarly shaped device, further attached with a rubber band.
Figure 7B:
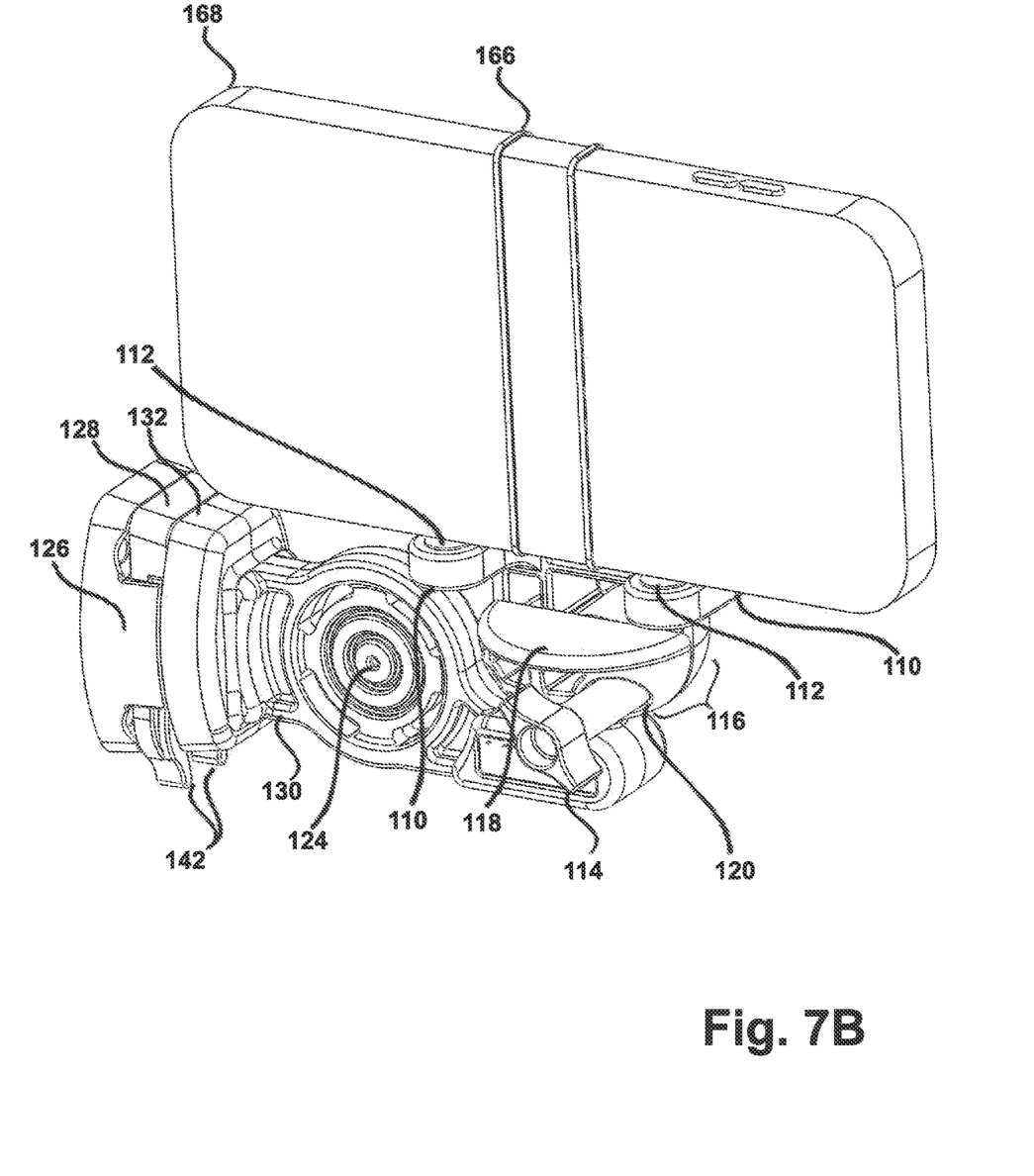
FIG. 7B is a partially exploded front facing isometric view of an embodiment with a magnetic command post type mount for cell phones and other similarly shaped devices showing the addition of a cell phone, or similarly shaped device, further attached with a rubber band.

FIGS. 7A & B show a similar embodiment as shown in FIGS. 1-3, and 6 and share a similar description of the embodiment as described above with respect to FIGS. 1-3, and 6.

FIG. 7A is a partially exploded back facing isometric view of an embodiment with a magnetic command post type mount for cell phones and other similarly shaped devices showing the addition of a cell phone 168, or similarly shaped device, further attached with a rubber band 166. FIG. 7B is a partially exploded front facing isometric view of an embodiment with a magnetic command post type mount for cell phones and other similarly shaped devices also showing the addition of a cell phone 168, or similarly shaped device, further attached with rubber band 166. Under extreme conditions, a blow to a cell phone or other similarly mounted video device 168 may overpower the 19 lbs. of pulling power of the Neodymium magnet 104. In order to combat this problem, a safety rubber band 168 attachment may be added to the cell phone type mount. In the rear of the gimbal base 116 there is a raised ridge 108 that will hold a supplied rubber band 166. The rubber band 166 is looped through from the front of the gimbal 118 and is looped up over the ridge 108. The top of the rubber band 166 is pulled under the phone 168 and pulled tightly up and hooked to a clip 102 provided on the top and behind the magnet 104. A rubber band grasping hook 102 is used to secure the rubber band 166 giving holding power in addition to the magnet cell phone connection post 104. The other end of the rubber band is attached to the ridge 108 located on the base plate of the gimbal. The rubber band is to be inserted through the rubber band slot 106 provided under the phone holding legs 110, looped up and over the ridge 108, pulled tightly toward the front of the gimbal 118 once the cell phone or similarly sized device is in position 168, and securely held by the magnet 104. The rubber band 166 is to be pulled up in front of the cell phone/similarly sized device 168 and attached to the rubber band clip 102 above and behind the magnet 104 for increased holding power of the magnet 110/phone connection. The soft foam rubber pads 112 that may be applied with two-sided tape may be attached to the cell phone holding legs/shelves 110 in order to allow the cell phone/other similarly sized device 168 a soft base that helps with positioning, reduces vibration, and adds holding power. The rubber pads 112 help keep the cell phone/other similarly sized device 168 secure and held flat on the supporting arms 110. This rubber band 166 safety attachment gives the user a fantastic hold in extreme situations.

Figure 8:
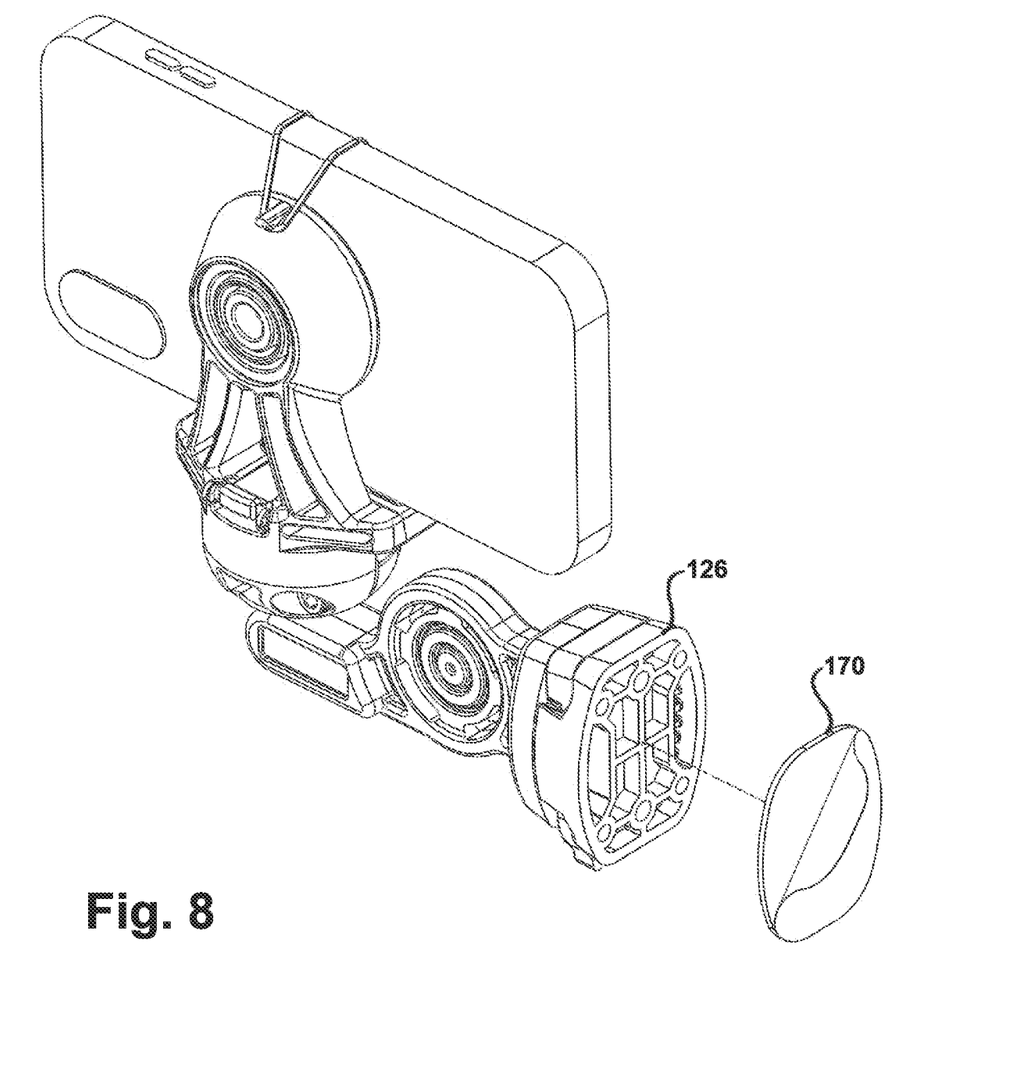
FIG. 8 is a partially exploded back facing isometric view of an embodiment with a magnetic command post type mount for cell phones and other similarly shaped devices showing the addition of a mounting tape added to the base plate.

FIG. 8 show a similar embodiment as shown in FIGS. 1-3, 6, and 7 and share a similar description of the embodiment as described above with respect to FIGS. 1-3, 6, and 7. Only callouts pertinent to the application of 3M VHB tape 170 to the base plate 126 are shown in FIG. 8 to avoid confusion. FIG. 8 is a partially exploded back facing isometric view of an embodiment with a magnetic command post type mount for cell phones and other similarly shaped devices showing the addition of a mounting tape 170 added to the base plate 126. In addition to screw attachments the six holed base 126 may be attached to an object with 3M VHB tape 170 as well as other attachment means such as, but not limited to: magnetic, picatinny rail, suction cup, hasps clasps, or other means as understood by one of skill in the art.

The foregoing description of the invention has been presented for purposes of illustration and description. It is not intended to be exhaustive or to limit the invention to the precise form disclosed, and other modifications and variations may be possible in light of the above teachings. The embodiments were chosen and described in order to best explain the principles of the invention and its practical application to thereby enable others skilled in the art to best utilize the invention in various embodiments and various modifications as are suited to the particular use contemplated.

What is claimed is:

1. A system for securing video equipment to an object, said system comprising:
   a gimbal assembly to accommodate at least one type of video equipment having an arm for attaching to said object;
   a dampener base disposed on one side of said arm of said gimbal, wherein said dampener base has vibration concentrating ridges/rings that focus vibrations of said arm into an attached vibration dampener;
   said vibration dampener positioned at a center of said vibration concentrating ridges/rings of said dampener base on said arm of said gimbal assembly such that said vibrations of said arm of said gimbal assembly are focused into said vibration dampener;
   a base facing end of said arm of said gimbal assembly;
   a quick release clip attached to said base facing end of said arm of said gimbal assembly; and
   wherein said gimbal assembly is attachable to said object via a base plate, wherein said object is a vibration causing object, and wherein said base plate is connected to said quick release clip attached to said arm of said gimbal assembly.

2. The system of claim 1 further comprising:
an arm backside dampener base disposed on an opposite side of said arm from said dampener base of said gimbal, wherein said arm backside dampener base also has vibration concentrating ridges/rings that focus vibrations of said arm into an additional attached vibration dampener; and
said additional vibration dampener positioned at a center of said arm backside vibration concentrating ridges/rings of said arm backside dampener base on said arm of said gimbal assembly such that said vibrations of said arm of said gimbal assembly are focused into said additional vibration dampener.

3. The system of claim 1 wherein a ball of a ball and socket portion of said gimbal assembly is overmolded with a softer rubber compound.

4. The system of claim 1 wherein said base plate is attached to said object with two-sided mounting tape.

5. The system of claim 1 wherein said base plate is attached to said object by at least one of a group of attachment methods chosen from: magnetic, picatinny rail, suction cup, hasps clasps, and screws.

6. The system of claim 1 wherein said gimbal assembly further comprises:
a magnetic post disposed vertically from said gimbal assembly;
a magnet attached at a top of said magnetic post; and
two video equipment holding shelves disposed perpendicular to said magnetic post at a base of said magnetic post to hold said video equipment.

7. The system of claim 6 further comprising two rubber pads attached one each to said two video equipment holding arms.

8. The system of claim 6 wherein said magnet is a 19 lb. Neodymium magnet.

9. The system of claim 6 further comprising:
a magnet dampener base disposed on a backside of said magnet, wherein said magnet dampener base also has vibration concentrating ridges/rings that focus vibrations of magnetic post into an additional attached vibration dampener; and
said additional vibration dampener positioned at a center of said magnet vibration concentrating ridges/rings of said magnet dampener base such that vibrations of said magnetic post are focused into said additional vibration dampener.

10. The system of claim 6 further comprising:
a rubber band hook located a top of said magnetic post;
a rubber band slot between said two video equipment holding shelves;
a rubber band ridge at a base plate of the gimbal; and
wherein a rubber band is hooked over said rubber band hook around an attached piece of video equipment, through said rubber band slot and over said rubber band ridge such that said attached piece of video equipment is held by said rubber band in addition to said magnet.

11. The system of claim 1 wherein said gimbal assembly further comprises:
a T-shaped camera base disposed to hold an action camera; and
a rubber pad cut to fit said T-shaped camera base attached on top of said T-shaped camera base.

12. The system of claim 11 wherein said T-shaped camera base and said rubber pad have a T-shaped slot for said action camera attachment.

13. The system of claim 11 wherein said T-shaped camera base has a rounded radius on a back of said T-shaped camera base to accept round shaped/round bottomed action cameras.

* * * * *